March 31, 1953 L. E. TOPHAM ET AL 2,633,060
DEVICE FOR PREVENTING COLLISIONS BETWEEN GUNS
Filed March 25, 1946 14 Sheets-Sheet 1

Inventors
Laurence E. Topham
Philias H. Girouard
By their Attorney

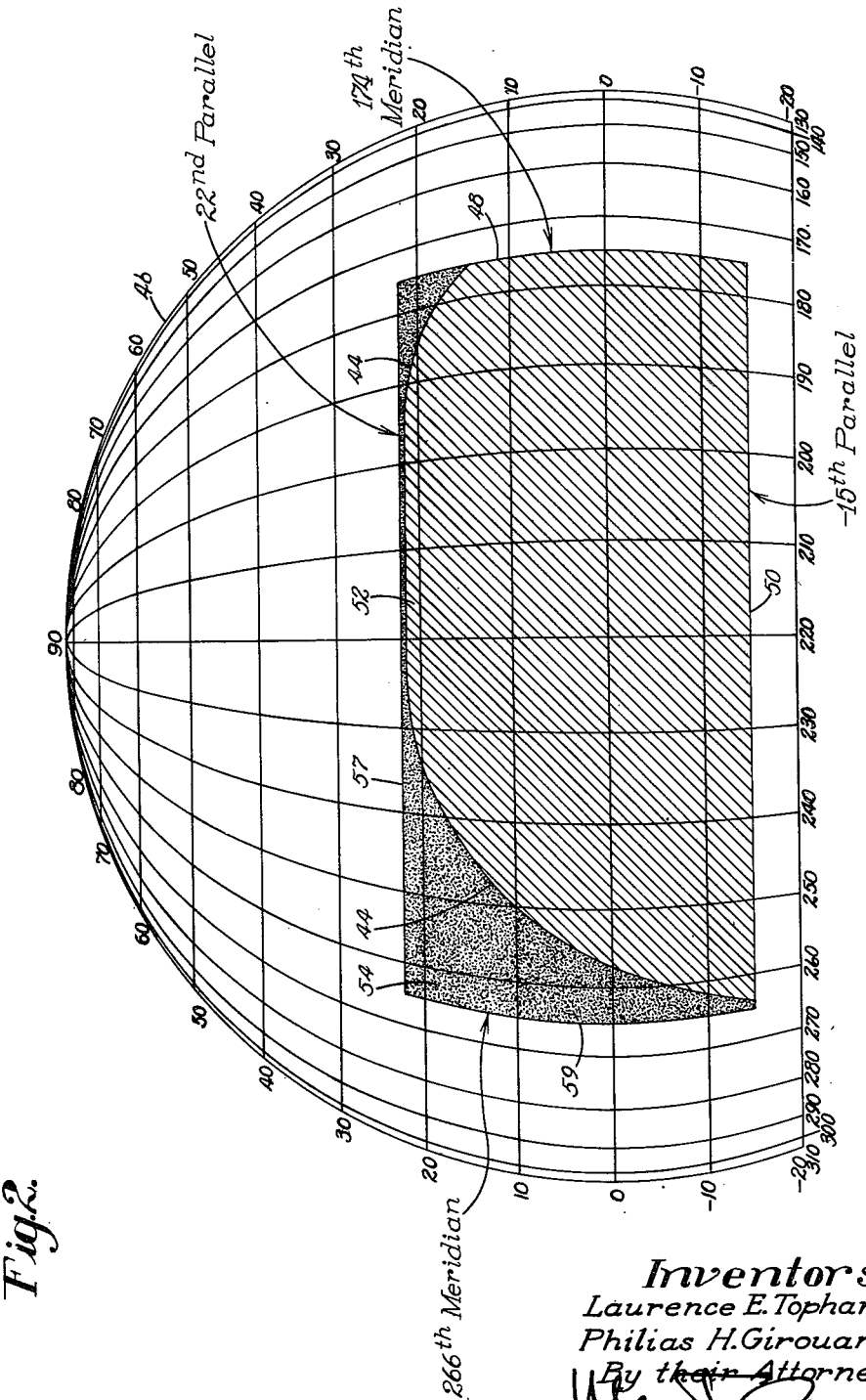

Inventors
Laurence E. Topham
Philias H. Girouard
By their Attorney

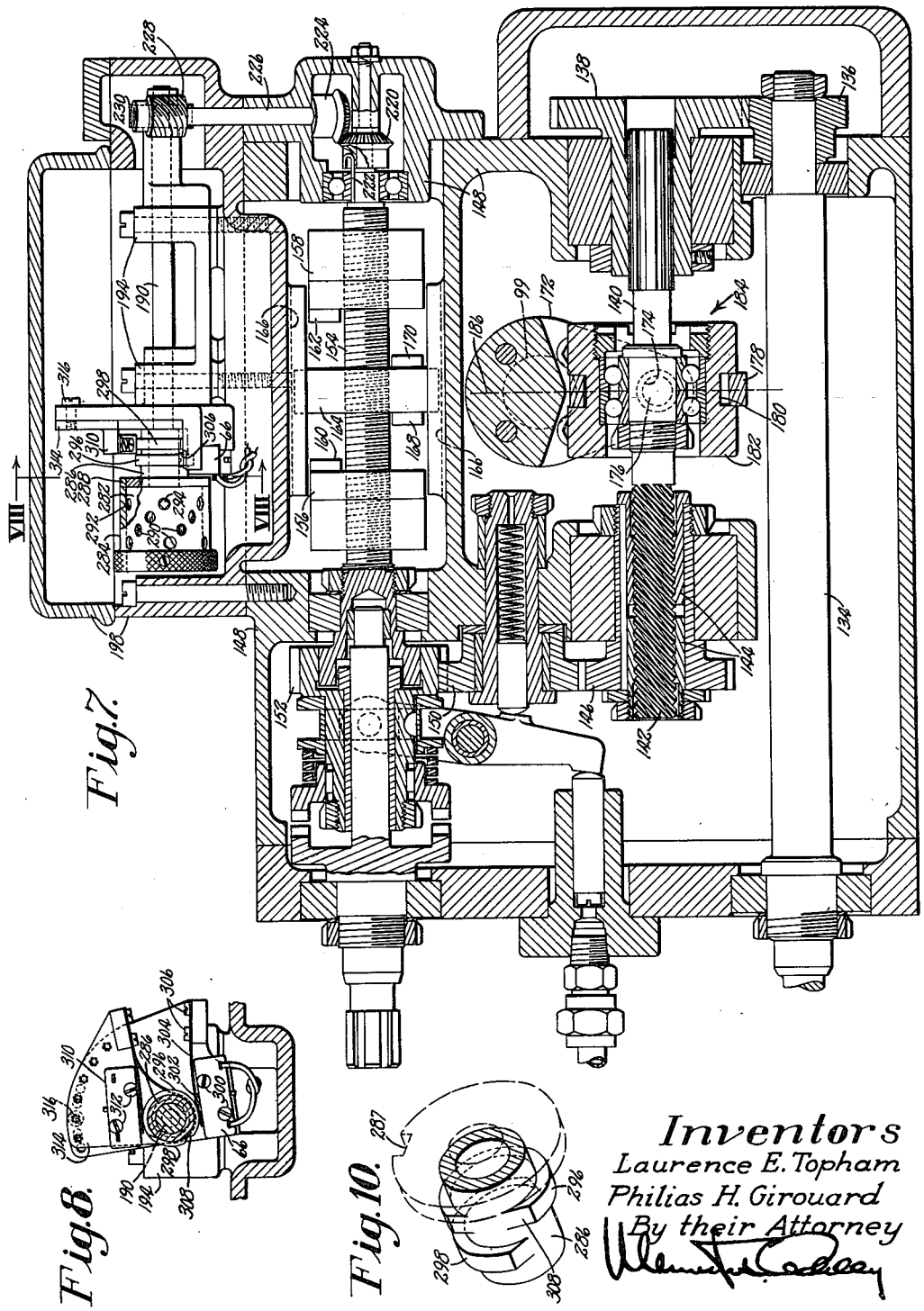

March 31, 1953     L. E. TOPHAM ET AL     2,633,060
DEVICE FOR PREVENTING COLLISIONS BETWEEN GUNS
Filed March 25, 1946     14 Sheets-Sheet 7

Inventors
Laurence E. Topham
Philias H. Girouard
By their Attorney

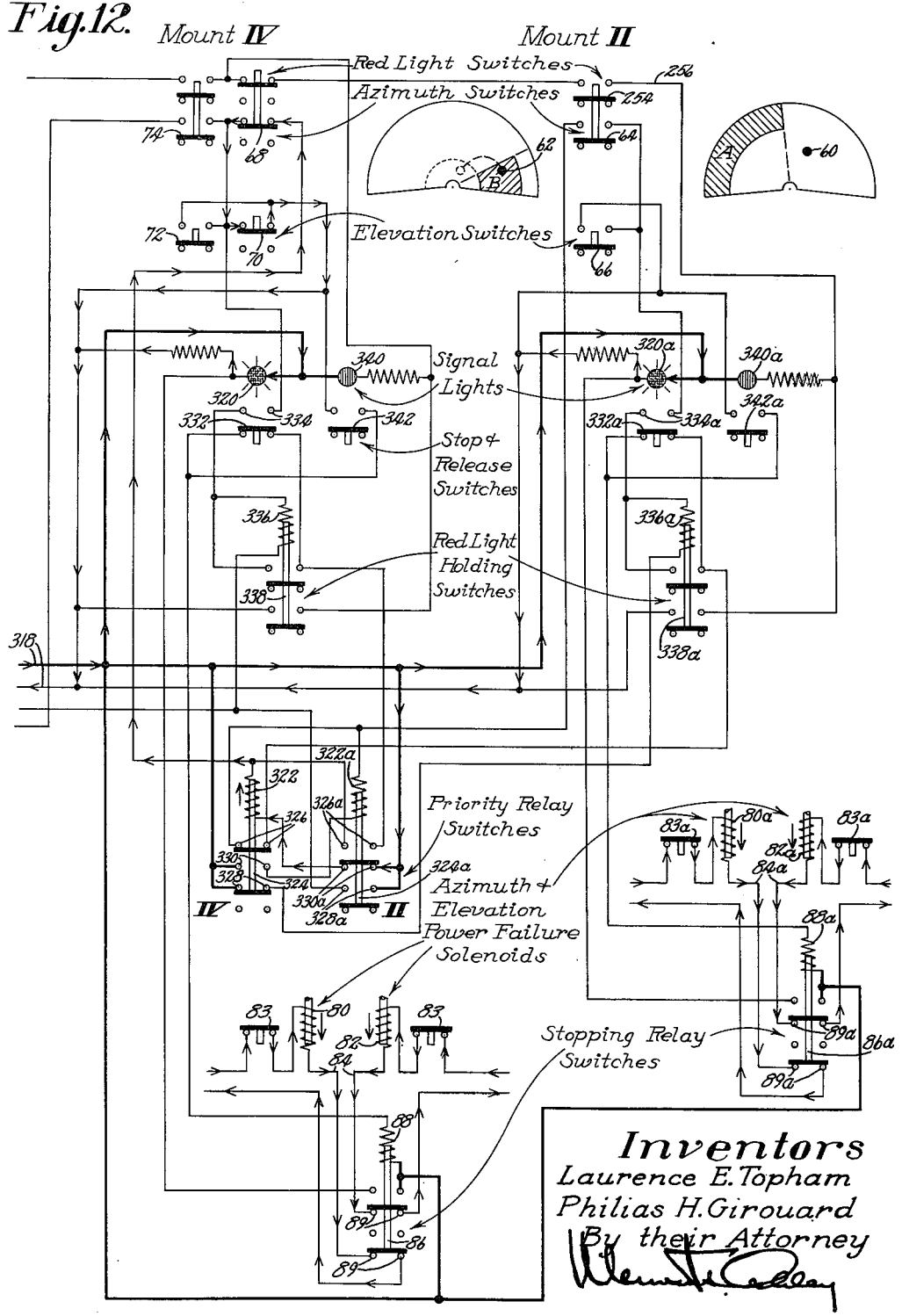

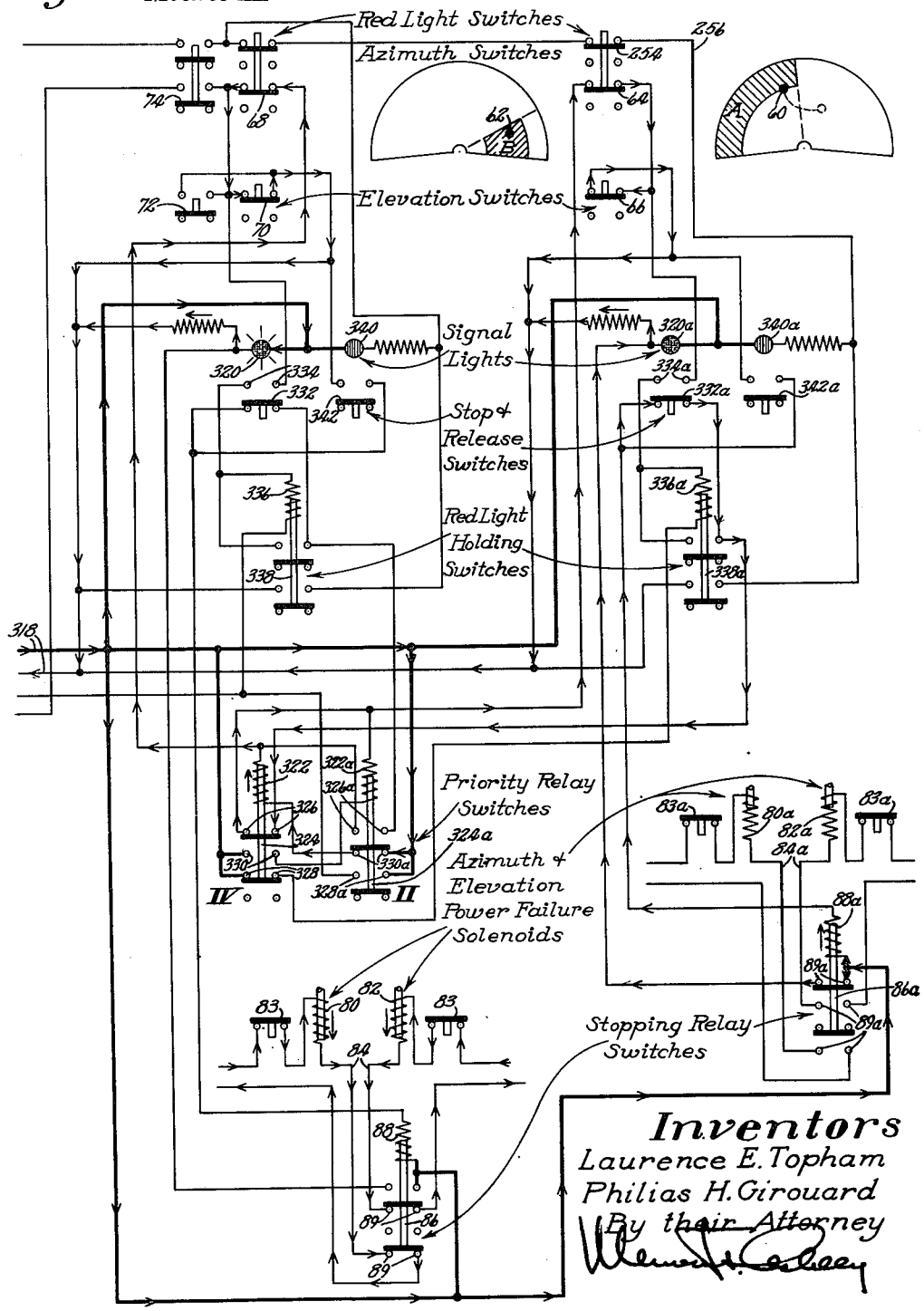

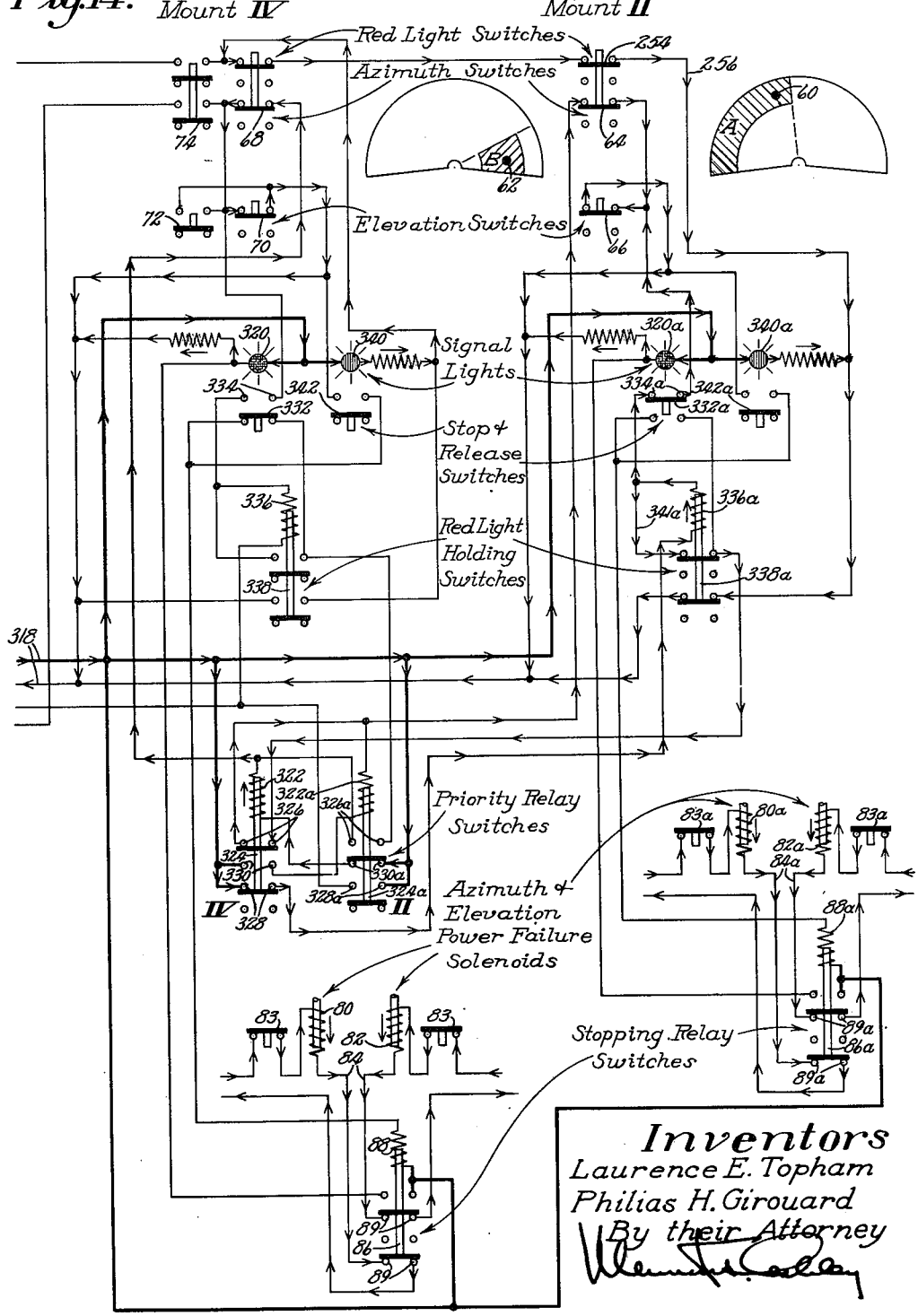

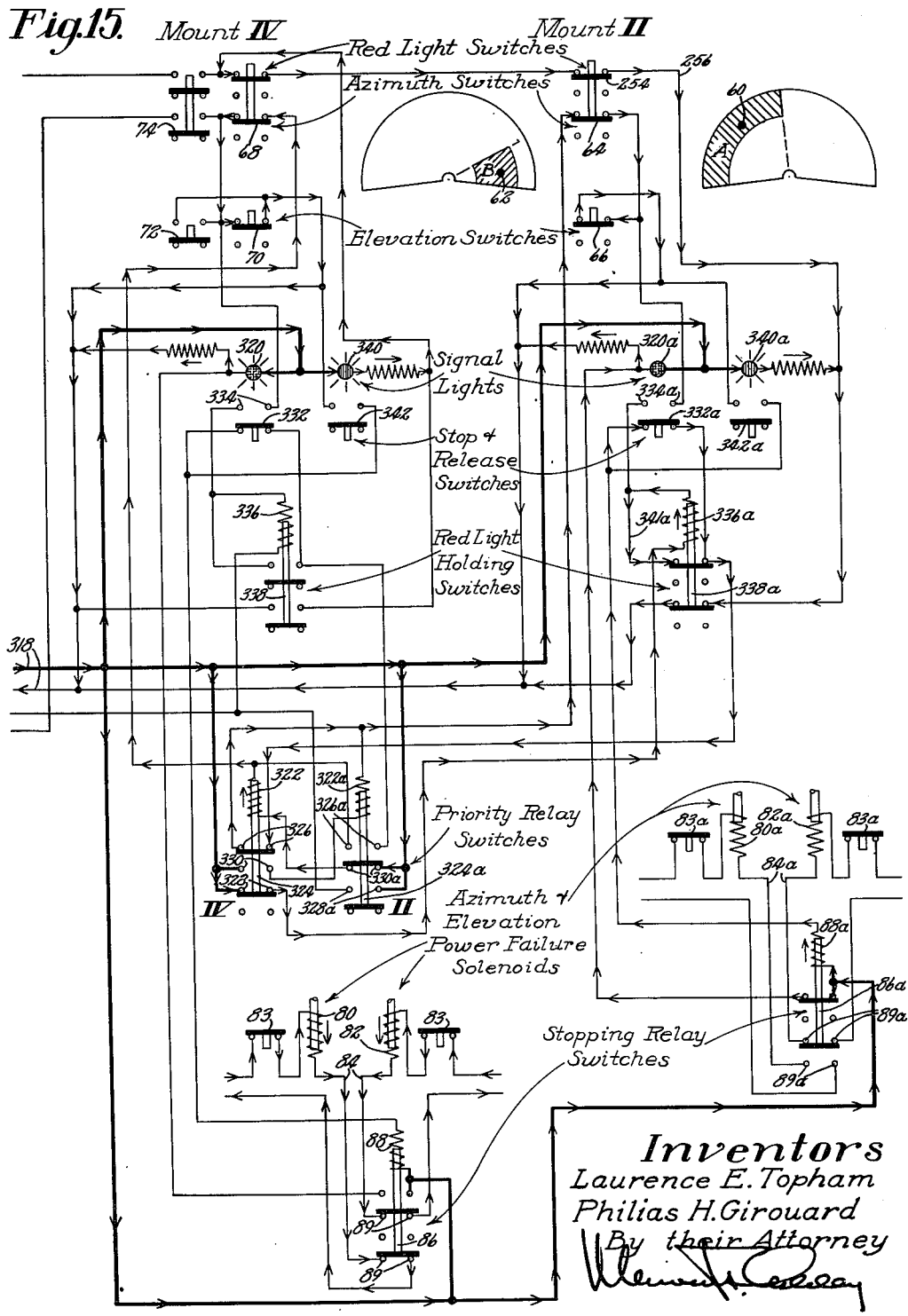

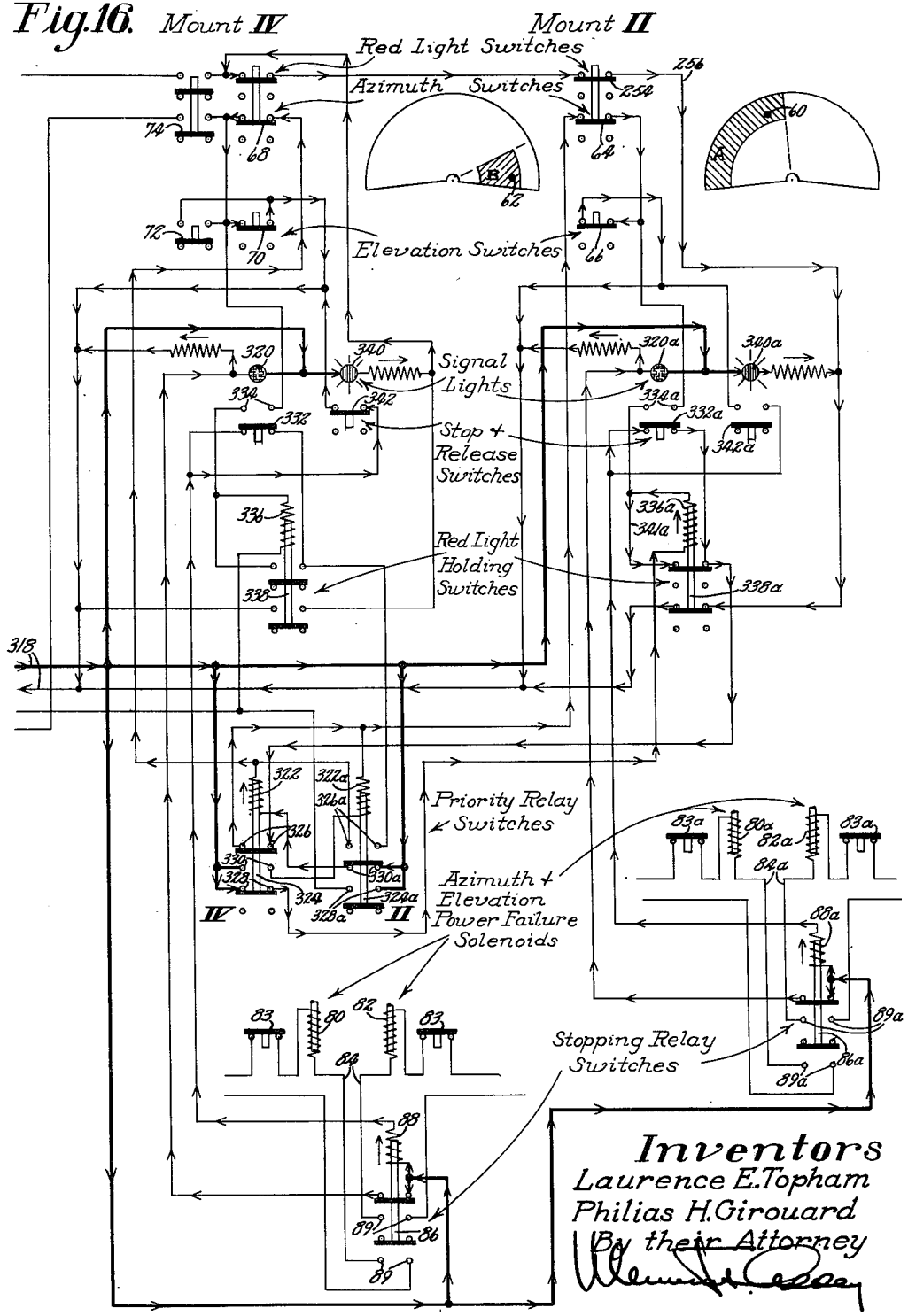

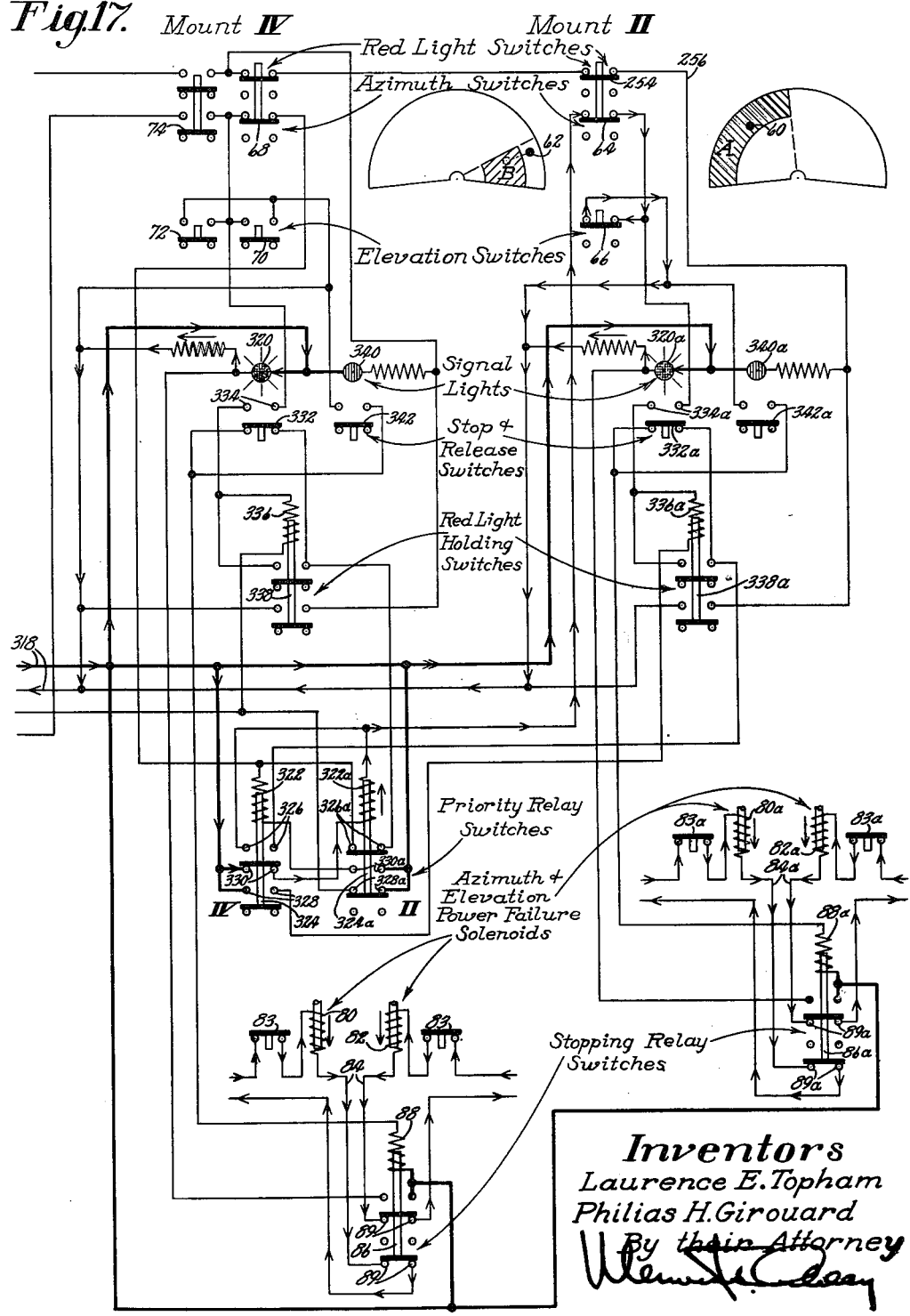

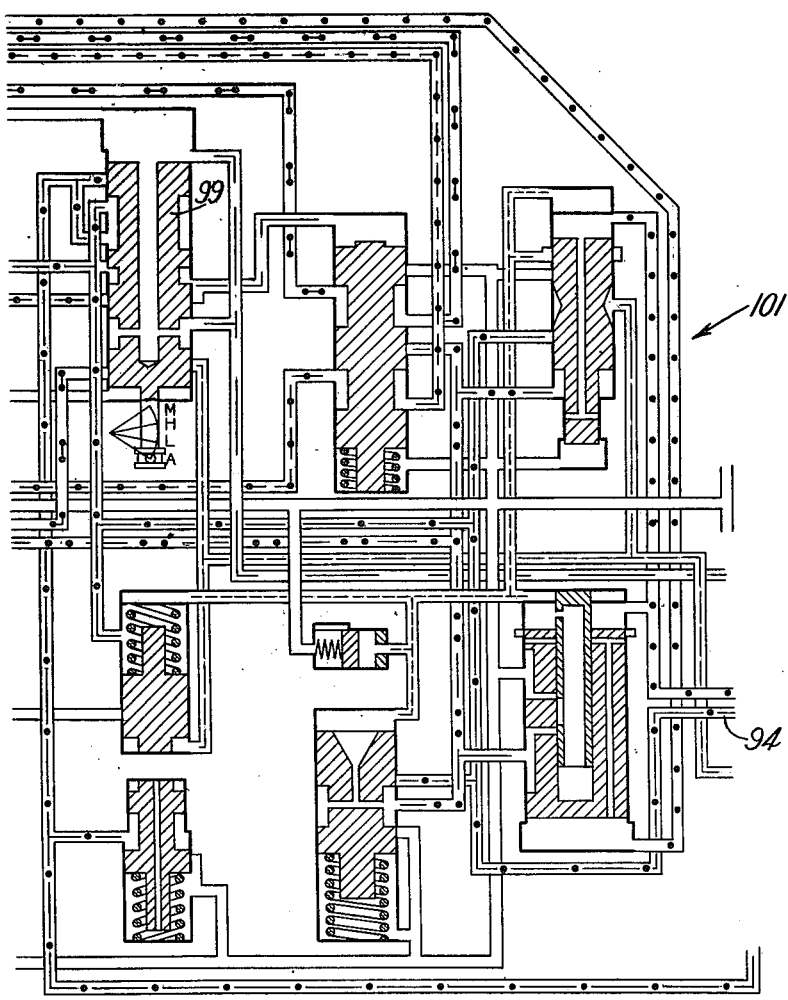

Patented Mar. 31, 1953

2,633,060

UNITED STATES PATENT OFFICE 2,633,060

DEVICE FOR PREVENTING COLLISIONS BETWEEN GUNS

Laurence E. Topham, Wenham, Mass., and Philias H. Girouard, Washington, D. C.; said Topham assignor to United Shoe Machinery Corporation, Flemington, N. J., a corporation of New Jersey Application March 25, 1946, Serial No. 657,020

14 Claims. (Cl. 89—41)

This invention relates to ordnance and more particularly to mechanism for preventing collisions between guns of adjacent mounts positioned close together aboard battleships.

In recent battleship construction it has become necessary to position mounts so close together that there is serious interference between the guns of adjacent mounts, collisions between said guns becoming a problem in view of the fact that more directors are used than previously because of the greatly increasing number of aerial targets.

With the vertical axes of rotation of adjacent mounts arranged close together because of limited space available, there are certain combinations in elevation and azimuth for the guns of each mount where interference with the guns of an adjacent mount is possible, such combinations being referred to as the zone of interference for that particular mount. It will be apparent that the sizes and shapes of such zones vary in accordance with such factors, for example, as the distance between the vertical axes of adjacent mounts, the lengths of the barrels or tubes of the mounts, and the relative levels of said mounts.

With the foregoing considerations in view, it is an object of the present invention to provide a control device for effectively preventing collisions between guns of adjacent mounts having a common zone of possible interference and also to reduce to a minimum the likelihood of such collisions when the guns are permitted, at the risk of the captains of the mounts, to enter said common interference zone, for example, in the "pursuit" of a target.

With the above object in view and in accordance with a feature of the present invention, there is provided in a battery comprising two guns mounted for independent movement in azimuth and elevation and having a common zone of bodily interference, means for causing either of said guns to enter and move about uninterruptedly in said zone, provided the other gun is not in said zone, and automatic means for stopping either of said guns near the border of said zone whenever the other gun is in the zone.

The sizes and shapes of the actual zones of interference for two adjacent mounts is readily determined by the use of a small scale model of the mounts, said actual zones thereafter being bounded by meridians and parallels to produce zones having regular shapes, as will appear later, in order to simplify said control device. The general scheme is to prevent interference between the guns of adjacent mounts by affording no restraint to the guns of the mount first to enter its zone of possible interference, and second, to stop the guns of the adjacent mount just before one of said guns reaches the boundary of the interference zone for that mount, said guns, unless operated as will be hereinafter explained, being caused to remain inactive until such time as the guns of the first mount emerge from the interference zone.

The guns of said adjacent mounts are stopped just before they reach their interference zones by breaking, upon actuating an electromagnetic switch, normally closed circuits of azimuth and elevation power failure solenoids now commonly de-energized to stop said guns by opening stop switches which are manually operated by the mount captains. In the illustrative control device there is provided automatic means for energizing the coil of said electromagnetic switch as a gun of a second mount of a pair of adjacent mounts having a common zone of possible interference attempts to enter said zone, with the result that the normal currents of the azimuth and elevation power solenoids are broken, causing high-pressure oil in hydraulic gun operating drives for the mount to be dumped and tilting plates of said drives to be centered, thus stopping the guns of the mount.

Because of the changeable inertia of the mounts and their guns, the stopping of the guns has its beginning a substantial distance outside the interference zone, the distance increasing in accordance with the speed of the guns and their associated mounts in azimuth and the speed of the guns in elevation in their mounts. The azimuth and elevation limit stop screws of the hydraulic gun operating drive for the mounts are utilized for stopping the guns, since such screws rotate in timed relation with the guns in azimuth and elevation, respectively, and advance proportionately to the speed in azimuth and elevation of said guns.

The illustrative control device also comprises means for enabling the captain of the second mount stopped at the edge of said interference zone to cause, at his discretion, the guns of said second mount to enter the interference zone when, for example, there is no imminent danger of collision and said guns are being trained upon a target. Such action is effected by manually pressing a release or restart switch in said second mount, causing the power failure solenoids of that mount again to be energized so long as the switch remains pressed, with the result that the hydraulic drives for the guns of the mount are again rendered operative. Each of the mounts, in accordance with another feature of the invention, is provided with amber colored signals which are lit only when the guns of the mount are powered and also with red colored signals which are lit only when the guns of both of the mounts are in the interference zone. By the provision of the above signals, which are automatically operated at the proper times as will be hereinafter explained, the captain of each of the mounts is informed whenever the guns of his mount and those of an adjacent mount are powered and are in the common interference zone, and thus proceeds with the proper caution under such conditions.

Various other features of the invention will be understood and appreciated from the following description read in connection with the accompanying drawings which illustrate one embodiment of the invention and in which Fig. 1 is an outboard view of three turrets or mounts simulating three of a battery of five turrets or mounts mounted upon the port side of a battleship;

Fig. 2 is a view showing on a sphere a zone of interference for the guns of mount II with the guns of mount IV;

Fig. 4a shows means including a selector valve for determining the location from which a tilting plate actuating piston shown in Fig. 4 is controlled;

Fig. 7 is a vertical section showing portions of a gun elevating drive corresponding to the mount azimuth drive shown in Fig. 5 and also showing portions of the mechanism for operatively connecting the limit stop mechanism with a ring gear of one of the mounts or with a segment gear of the guns incorporated in said mount;

Fig. 8 is a section on line VIII—VIII of Fig. 7;

Fig. 10 shows in perspective the switch operating elevation cam illustrated in Fig. 7; and Figs. 11 to 17 are wiring diagrams showing the portion of the illustrative device effective in preventing interference between the guns of mounts II and IV, operating under different conditions.

The present invention is illustrated as embodied in an interference control device for preventing collisions between the barrels or tubes 30 (Fig. 1) of twin 5″ guns 32 of adjacent turrets or mounts 34 arranged close together in a battery 36 on the port side of a battleship (not shown).

Five mounts numbered II (Figs. 1 and 3), IV, VI, VIII (Fig. 3) and X are referred to, mount IV and VIII being positioned outboard of and below the mounts II, VI and X. Since the hereinafter described mechanism for preventing collisions between the guns 32 of the two forward mounts II and IV is substantially the same as that for preventing collisions between the guns of the other adjacent mounts, it will be necessary only to describe in detail the construction and operation of mounts II and IV.

As above stated, there are certain combinations in elevation and train or azimuth for guns 32 of each mount when collision with one or both of the guns of an adjacent mount is possible, all of such combinations being referred to as within the zone of possible interference for that particular mount. Because of the different trunnion levels of the guns 32 of the adjacent mounts, the shape and size of the zones of interference A and B (Figs. 3, 11 to 17) of the guns 32 of the upper mounts II and VI and of the lower mounts IV and VIII, respectively, shown, as will be hereinafter explained, in the form of azimuth equidistant projections centered at the north poles of spheres, are different, said zones of interference A of the guns 32 of the upper mounts II and VI being of considerable area and of substantially the same general shape, and the zones of interference B of the guns 32 of the lower mounts IV and VIII being of substantially the same area and shape and of different area and shape from the zones A. The single zone C (Fig. 3) of interference of the guns of mount X with the guns of mount VIII is somewhat similar to but more extended than zone A.

In order to avoid duplication in the description it will be necessary to refer only to the interference between the guns 32 of mounts II and IV and to describe mechanism by the use of which the crewmen or "captains" of these two mounts, by keeping the guns of their mounts out of the common zone of possible interference between the mounts when one or more of the guns of an adjacent mount are in said zone, can eliminate interference, as well as to describe mechanism by the use of which the captains of the two adjacent mounts can reduce to a minimum collisions between the guns of said mounts even though the guns of both mounts are in said common interference zone.

Figure 1:
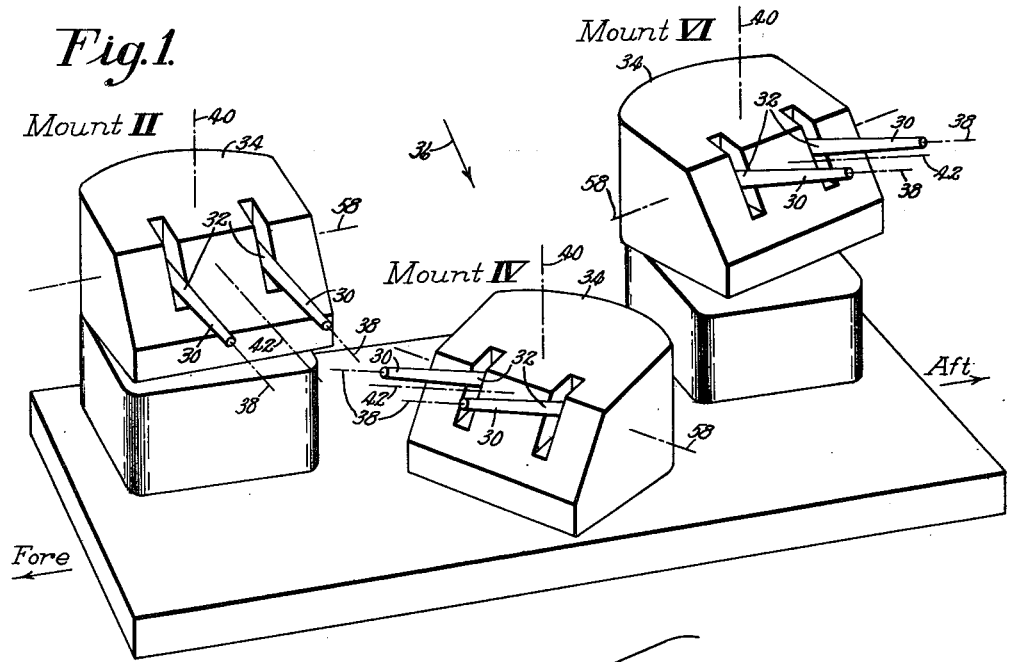

It will be appreciated that the axes 38 (Fig. 1) of the bores of the barrels 30 of the guns 32 of each mount is offset laterally from the vertical axis 40 of rotation of that mount. In determining the zones of interference between the guns 32 of the adjacent mounts, axes 42 (Fig. 1), which are arranged parallel to and midway between the axes 38 of the bores of the barrels 30 of the guns of the respective mounts and pass through the vertical axes 40 of rotation of the mounts, have been utilized. In the course of providing an embodiment of the invention, the size and shape of the zones A, B and C of possible interference between the guns 32 of the different adjacent mounts were determined by the use of a small model, such as illustrated in Fig. 1, of the mounts of a battleship equipped with said control device, the guns of the mounts of the model being swung into a great number of different marginal interfering positions.

For each marginal interference setting of the guns 32 of mount II with the guns of mount IV the positions of the axis 42 in azimuth and elevation, which axis will hereinafter be referred to as the central axis, were noted and a line 44 (Fig. 2) on a sphere 46 was developed. As will appear later, the line 44, together with a portion of the 174th meridian indicated by reference numeral 48, along which the central axis 42 may move in elevation when the mount II is in its rear limit of movement in azimuth, together with a portion of the —15th parallel indicated by reference numeral 50, along which the central axis 42 may move in azimuth when the guns are in their lowered limit of movement in elevation, form a sectioned spherical area 52 which may be referred to as the actual zone of interference of the guns 32 of mount II with the guns of mount IV. When the central axis 42 of mount II has azimuth and elevation settings which bring it within the actual interference area 52, one or more guns of the mount II may be said to be in the zone of possible interference for that mount with the guns of mount IV. The actual zones of interference of the guns 32 of the various mounts II, IV, VI, VIII and X with the guns of adjacent mounts may be determined in a similar manner by utilizing the central axis 42 of the particular mount, the arrangement being such that when the central axis 42 of any mount has an azimuth and elevation reading carrying it into its zone, there is a possibility of interference between one or more guns of that mount and the guns of an adjacent mount.

When the interference control device was later incorporated in a battleship, the actual zones of interference of the guns of different mounts of the battleship were determined, for the purpose of checking the actual conditions, by the swinging of the guns of said mounts into a plurality of different marginal interfering positions, as above explained in connection with the model of the mounts. The guns 32 of the various mounts are described as being arranged at 0° in azimuth and 0° in elevation when their central axes 42 are pointed directly forward and horizontally. The degrees in azimuth increase as the central axis moves clockwise as viewed from above (Fig. 3), the degrees in positive elevation increasing as the guns are raised from the horizontal and the degrees in negative elevation, indicated by a minus sign, increasing as the guns are lowered from the horizontal.

Figure 3:
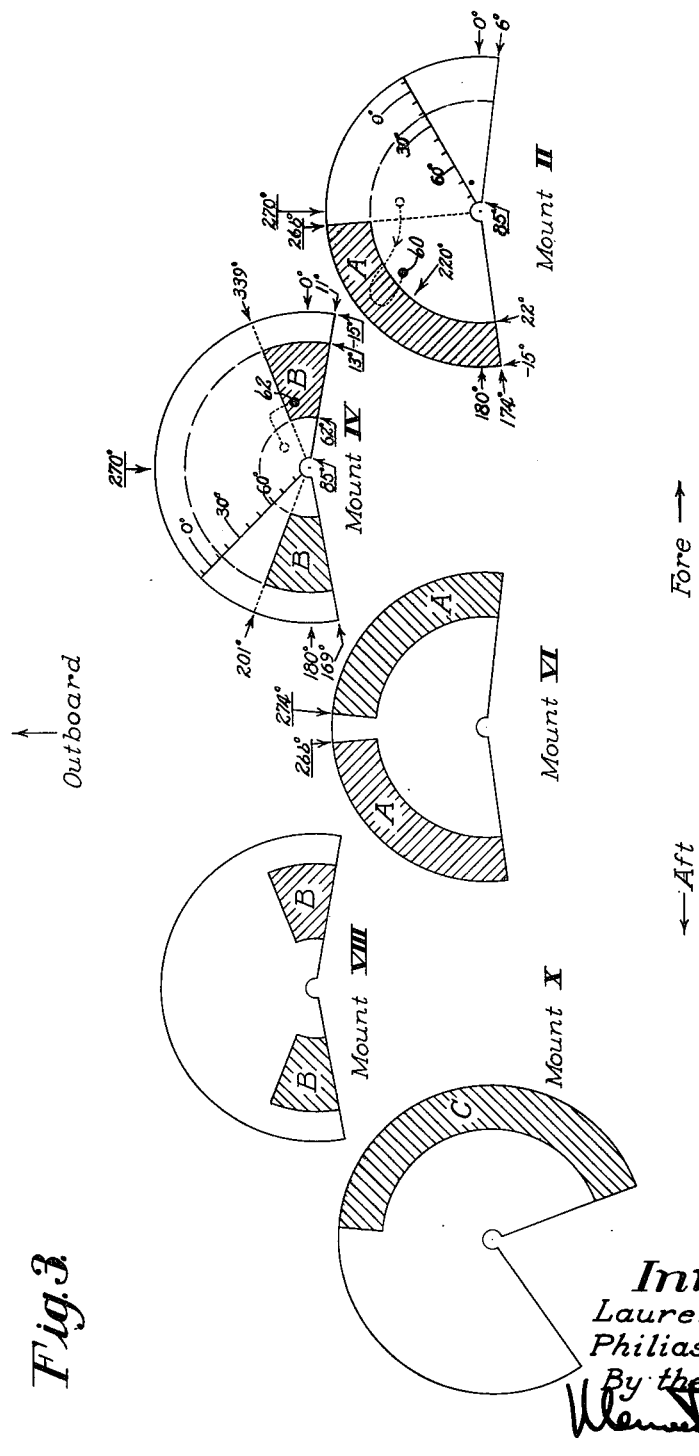
Fig. 3 is a view showing, in the form of azimuth equidistant projections centered at the north poles of spheres, the zones of interference for the guns of the five mounts of the battleship.

Mounts II and IV, as well as mounts VI and VIII, are provided with hydraulic stop mechanism, hereinafter described, for limiting clockwise swinging movement of the mounts in azimuth, as viewed in Fig. 3, when the central axis 42 reaches the 6th and the 11th meridians, respectively, and for limiting counterclockwise movement of the mounts in azimuth when the central axis has been swung counterclockwise, as viewed from above, to the 174th and the 169th meridians, respectively. All of the illustrative mounts, as will be explained later, are provided with hydraulic stop mechanism for limiting negative elevation of the guns, that is, downward movement on Figs. 1 and 2 and outward movement on Fig. 3, when the central axis 42 of the guns 32 registers —15° in elevation and thus intersects the parallel represented in Fig. 2 by reference numeral 50. Positive elevation of the guns 32, that is, upward movement on Figs. 1 and 2 and inward movement on Fig. 3, is limited when the central axis 42 of the mounts has been raised to the 85th parallel, the horizontal setting of the guns, as above stated, being considered 0° in elevation.

The actual interference zone 52 of mount II is somewhat irregular and it will be understood that the actual interference zones (not shown) of the other mounts are also irregular. In order to simplify mechanism hereinafter described for registering when one or more guns of a mount enters the interference zone for that particular mount, said zones are defined by parallels and meridians which include said actual zones. For example, the zone 52 of actual interference of mount II is bounded by the 22d and the —15th parallels, indicated by reference numerals 50 and 57, respectively, and by the 174th and 266th meridians, indicated by reference numerals 48 and 59, respectively, thus forming a combined zone comprising the shaded zone 52 and added zone 54, which together form zone A.

It will be noted that the meridian and parallel indicated by reference numerals 59, 57, respectively, are spaced slightly from the actual interference zone to allow a little margin for safety in entering the zone. It will be apparent that such practice results in enlarging the zones of interference, but the advantages gained in simplifying the interference control mechanism by causing said zones to be bounded by meridians and parallels justifies such practice. Although the actual zones of interference of mounts IV, VIII and X are not shown, it will be understood that the actual zones of interference of these turrets are first determined and are then bounded by parallels and meridians, the process being the same as that described in connection with mount II.

In hereinafter referring specifically to the zones of possible interference for mounts II and IV and generically to zones of possible interference for mounts VI, VIII and X, it will be convenient for purposes of illustration for said zones to be projected on flat surfaces. Accordingly, said zones of interference for the various mounts, which zones are included between parallels and meridians, are shown in the form of the above-mentioned azimuth equidistant projections A, B and C centered at the north poles of spheres, as shown in Fig. 3. As above stated, interference between the guns 32 of mounts II and IV only will be discussed in detail, it being understood that a like condition of possible interference exists between the guns of other pairs of adjacent mounts.

It will be appreciated that the central axis 42 (Fig. 1) between the guns 32 of each of the mounts moves in elevation degree by degree about the common axis 58 of the trunnions (not shown) of said guns, together with the axes 38 of the bores of the barrels 30 of the guns and, accordingly, when the central axis 42 of each of the mounts is moved downward in negative elevation, for example, across the 22d and 62d parallels and into the interference zones A and B, respectively, of the mounts II and IV, the axes 38 of the guns 32 of that particular mount are depressed across said parallels. It will be understood, however, that when the central axis 42 of any one of the mounts moves across a meridian of the indicated zone for that particular mount, one of the barrels or tubes 30 of the guns 32, which are laterally offset from the central axis, will have crossed that particular meridian of the illustrative zone, but said barrel does not enter its zone of interference with the guns of the adjacent mount until the associated central axis 42 crosses said meridian. In describing the invention, however, we shall consider one of the guns 32 of the mount II, for example, as entering the zone A across the 266th meridian, indicated by reference numeral 59, at the same time that the central axis 42 between the guns crosses said meridian. The position in azimuth and elevation of the central axis 42 of each of the mounts II and IV may be conveniently shown by a black dot, a course of said axis being indicated by a dotted line terminating at said dot. In view of the fact that one or more of the guns of each mount may be said to enter the zone of interference for such mount at the same time that the associated axis 42 of the mount enters its zone, the dots, for purposes of illustration, may represent the movement of said guns, which will be referred to as entering said zones A and B, establishing priority in one of said zones and emerging from said zones, as will be explained later in detail.

It will be apparent from the foregoing that when the central axis 42 of mount II has been so moved in azimuth and elevation that it extends into zone A, corresponding to the combined zones 52 and 54 (Fig. 2) bounded by the 174th and the 266th meridians and by the —15th and the 22d parallels, one or more of the guns 32 of mount II, represented by a dot 60 (Figs. 3, 11 to 17), is in zone A. It will also be apparent that when the central axis 42 of mount II has been so moved in azimuth and elevation that it extends through the fore interference zone B of mount IV bounded approximately by the 11th and 339th meridians and the 13th and 62d parallels, there is a possibility of one of the guns of mount IV, represented by dot 62, interfering with one or more of the guns of mount II, providing that one or more of the guns of mount II are still in zone A for that mount. Since we are considering only the interference between the guns of mounts II and IV, the left interference zone B of mount IV need not be discussed in detail herein.

By providing a cam-operated switch 64 (Figs. 5, 6, 11 to 17) it is possible to register, or indicate, when the central axis 42 of mount II swings aft in azimuth (counterclockwise as viewed in Fig. 3) across the 266th meridian and by providing a cam-operated switch 66 (Figs. 7, 8, 11 to 17) to register when said central axis 42 is swung downward, as viewed in Figs. 1 and 2, in negative elevation (outward as viewed in Fig. 3) across the 22d parallel. As above stated, movement of the guns 32 of mounts II and IV as well as of the guns 32 of the other mounts in negative elevation is stopped by the regular limit stop mechanism of the mount when the central axis 42, and accordingly the axes 38 of the bores of the barrels of the guns, has been depressed in elevation to —15°. It will thus be apparent that there cannot be any entry of the guns of mount II into the interference zone A for that mount from below (Fig. 1) or across the outside rim (Fig. 3). Moreover, since the interference zone for mount II extends rearward to the 174th meridian, represented by reference numeral 48 (Fig. 2), at which counterclockwise movement in azimuth of the central axis 42 of that mount ceases, there can be no entry of the guns of mount II into its interference zone A across such meridian. It will thus be clear that the cam-operated switches 64, 66 are the only switches necessary to register movement of the guns of mount II into the interference zone for that mount and that when such switches have registered the above-mentioned movement of the central axis 42 across the 266th meridian and across the 22d parallel, one or more guns of mount II are about to enter or are in said interference zone.

In a similar manner, by providing a single cam-operated switch 68 (Figs. 11 to 17) it is possible to register entry of the central axis 42 of mount IV clockwise as viewed in Fig. 3 across the 339th meridian defining the outboard end of the fore interference zone B, and since such zone extends inboard to the limit of clockwise movement of the mount in azimuth, that is, to the 11th meridian, there is no counterclockwise entry of said central axis 42 and accordingly the guns of the mount across said 11th meridian. In order to register movement of the central axis 42 of mount IV in negative and positive elevation across the 62d and the 13th parallels, respectively, two cam-operated switches 70, 72 are provided. It will be understood that since the mount IV has an aft interference zone B (Fig. 3) there is provided a cam-operated switch 74 registering counterclockwise movement, as viewed in Fig. 3, of the central axis 42 and accordingly one or more of the guns 32 of that mount across the 201st meridian.

Assuming that the central axis 42 and accordingly one or more of the guns 32 of the mount IV, represented by dot 62 (Fig. 3), are moved in the right interference zone B in negative elevation across the 62d parallel in the path shown by dotted lines, the cam-operated switch 70, hereinafter described in detail, registering such movement, is closed. Should the central axis 42, and accordingly one or more of the guns 32, represented by dot 62, then move clockwise in said dotted path across the 339th meridian, one or more of the guns 32 of the mount will have moved into said zone, such movement being registered by the closing of the cam-operated switch 68. Assuming that neither of the guns 32 of mount II is in the interference zone A, one or more of the guns of mount IV are thus first in the common zone of interference between mounts II and IV and therefore mount IV has priority over mount II, the guns 32 of mount IV being permitted to move uninterruptedly in said zone.

The general scheme for preventing interference between the guns 32 of the adjacent mounts II and IV as well as between the other pairs of adjacent mounts is first, as above explained, to offer no restraint to the guns of the mount first to enter the zone of possible interference, which mount may be said to have priority, and second, to stop the guns of the adjacent mount just before they reach the outer boundary of the interference zone for that mount, said guns being caused to remain inactive at said boundary until such time as the guns of the mount having priority emerge from said zone. As will appear later, the guns 32 of the mount at the boundary of the interference zone for such mount may, even though one or more of the guns of the other mount are in said zone, enter the zone under the control of the captain of such mount. Upon such entry, however, there is a possibility of collision between the guns of the adjacent mounts, and accordingly means hereinafter described is provided to warn both captains of the mounts of this possibility.

The stopping of the guns 32 of the second mount about to enter its interference zone is accomplished by simultaneously opening 440-volt circuits 84, 84a (Figs. 4, 11 to 17) of azimuth and elevation power failure solenoids 80, 82, or 80a, 82a, of that mount in the same manner that such circuits are opened simultaneously by switches 83, 83a which are now utilized by the crews or captains of the mounts to stop at any time the movement of the guns.

The circuits 84, 84a of the power failure solenoids 80, 82 and 80a, 82a, respectively, are normally coupled for opening between the contacts of electromagnetic switches 86, 86a (Figs. 11 to 17), the coils 88, 88a of which are energized by a 110-volt circuit at such time as one of the guns 32 of the mount involved is second of a pair of guns of adjacent mounts to attempt to enter the zone of possible interference between said adjacent mounts. The effect of such energization of one of the coils 88, 88a is to open corresponding pairs of contacts 89, 89a of the switch 86, 86a, thus breaking the corresponding normal currents 84, 84a of the power failure solenoids, with the result that a power failure valve 90 (Fig. 4) is actuated. Such action causes the valve 90 to be operated by the action of a spring 92, permitting oil to flow from a high-pressure system 94 to an exhaust or low-pressure system 96 and accordingly causing by means not shown the approximate equalizing of pressure on an actuating piston 97, and the centralizing of a tilting box 98 together with a shaft 99 secured to said box, by released spring-actuated plungers 100 which are moved predetermined distances against stops (not shown) by their springs, the plungers being normally held in retracted positions in cylinders 102 by oil in the high-pressure system 94. As will be hereinafter explained, each of the tilting box shafts 99 is mounted for rotation about its axis in a fixed housing and is operatively connected to azimuth and elevation limit stop mechanisms, the construction and arrangement being such that the tilting box is automatically moved to its centralized position to limit movement of the mounts in azimuth or to limit movement of the guns in elevation in the mounts.

Power for driving each of the mounts in azimuth together with its guns 32 and for driving the guns in elevation upon their associated mounts is supplied from a continuously rotating electric motor 104 operatively connected through suitable reduction gears 106 to a drive shaft 108 secured to a cylindrical barrel 110. The tilting box 98 is provided with a cylindrical recess 112 constructed and arranged to receive a ring 114 which is universally connected to the drive shaft 108 and is operatively connected by a plurality of connecting rods 116 to pistons 118 slidable in cylinders 120 of the barrel. As the barrel 110 is rotated the lower ends of the cylinders 120 slide over arcuate recesses 122 of a block 124 opening into oil passages 126 which communicate with a fluid pressure motor 128 operatively connected through suitable gear connections 130 to a ring gear (not shown) of a corresponding mount, for rotating the mount, together with its guns, in azimuth, or to a gear segment (not shown) secured to guns of the mount and serving to actuate the guns in elevation in said mount. The above drive is well known in the art and is commonly referred to as a Waterbury variable-speed drive and is disclosed, for example, in Naval Ordnance Textbook published 1939 by the United States Naval Institute, Annapolis, Md.

Figure 4:
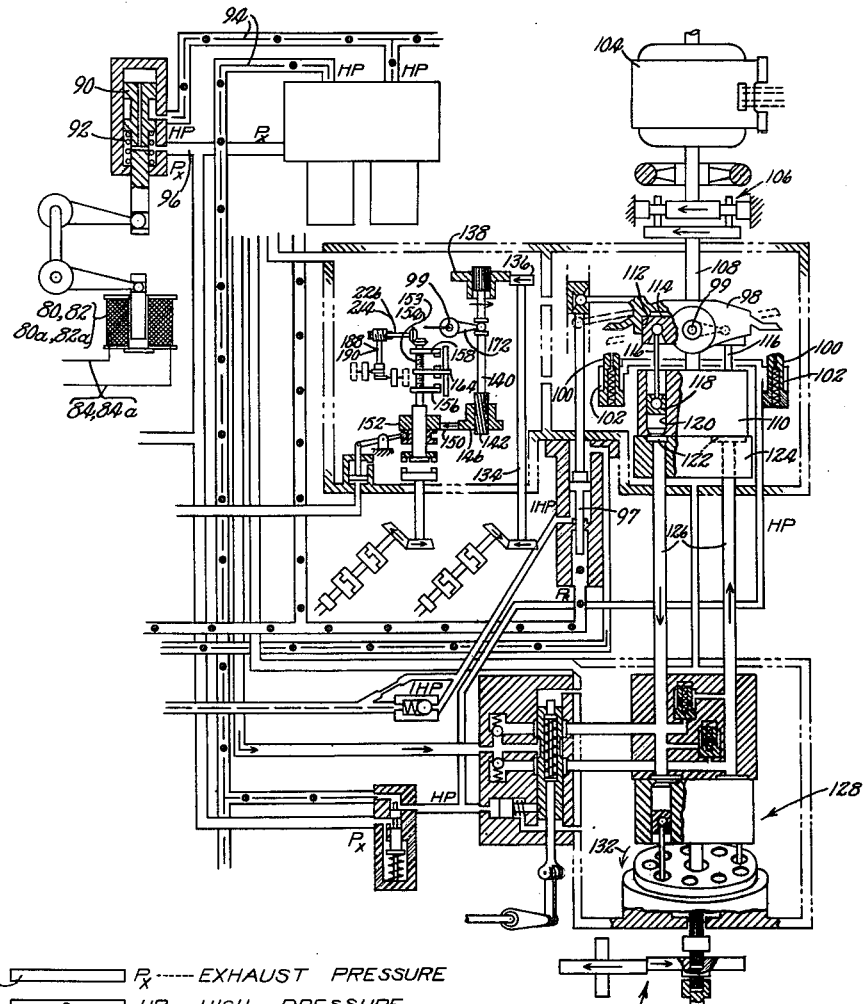
Fig. 4 is a diagrammatic view showing mechanism for rotating the mounts together with their guns in azimuth and for rotating the guns in elevation with relation to their mounts, together with mechanism for stopping the mounts or the guns upon the mounts at the limits of their motion and mechanism for stopping the guns at any other time at the will of the captains of the mounts.

When the tilting box 98 is moved from its central or neutral full-line position to its dash-line position shown in Fig. 4, oil is pumped through the passages 126 in directions indicated by arrows, causing rotation of the fluid pressure motor 128 in direction 132. When the tilting box 98 is moved in an opposite direction from its neutral position, it will be apparent that oil will be pumped in an opposite direction through the passages 126 and accordingly the fluid pressure motor 128 will rotate in an opposite direction, thus rotating the mount in azimuth together with its guns in an opposite direction, or swinging the guns in the mount in an opposite direction. It will be apparent that the greater the tilting of the box 98 from its centralized full-line position, the greater will be the flow of oil through and the pressure in the passages 126 and accordingly the rotative speed of the fluid pressure motor 128 and the rotative speed of the mounts or the guns upon their trunnions in the mounts. The actuating pistons 97, which are operatively connected to the various tilting boxes 98 and the positions of which determine the speed in azimuth of the mounts and the speed in elevation of the guns in the mounts, are controlled through suitable hydraulic means, and are operated by directors located some distance from the mounts or by trackers in said mounts, it being understood that when the high-pressure oil is dumped out of the systems, as above explained, the pistons are rendered inoperative and are moved to neutral positions under the action of the spring-pressed plungers 100.

Mechanism for limiting rotation of the various mounts in azimuth in opposite directions and for limiting swinging movement in elevation of the guns in their associated mounts in opposite directions is utilized in the herein illustrated construction for the purpose of stopping the guns of the mounts whenever it is desirable to keep the guns of one of the mounts out of the interference zone for that particular mount or whenever it is desirable to stop the guns of either of the mounts to prevent collision between guns of adjacent mounts when the guns of both mounts are operating in said interference zone.

Because of the variable inertia of the mounts and the guns in azimuth and the variable inertia of the guns in elevation, the stopping of the guns of the second mount about to enter a common interference zone has its beginning when said guns are a considerable distance outside said zone, said distance increasing as the rotative speed of the mount in azimuth and the rotative speed of the guns upon their mounts increases.

Movable in timed relation with and in response to movement of each mount and each pair of guns on the mount are shafts 134 (Figs. 4 and 7) respectively, each having secured to it a gear 136 meshing with a gear 138 splined to one end of a shaft 140 having at its opposite end helical threads 142 meshing with internal threads of a two-piece sleeve 144 forming in effect part of a gear 146, said gears 138, 146 being rotatably mounted in bearings in a housing 148. The gear 146 is operatively connected through an idler gear 150 to a gear 152 secured to a limit stop screw 153 (Fig. 5), 154 (Fig. 7) which is rotatably mounted in bearings in the housing 148 and has secured to it collars 156, 158 provided with projections 160, 162, respectively. Threaded onto each of the limit stop screws 153, 154 is a nut 164 upper and lower ends of which fit in guideways 166 of the housing 148, opposite sides of the nut 164 being provided with projections 168, 170 constructed and arranged to engage the projections 160, 162, respectively, of the collars 156, 158 when the nut has been slid predetermined distances in opposite directions upon the screw 153 or 154, said distances representing limits of movement in azimuth of one of the mounts or limits in elevation of the guns 32 on such mount.

Fixed to the tilting box shaft 99 (Figs. 4 and 7) is a bifurcated shift lever 172 having alined bores 174 (Fig. 7) for receiving trunnions 176 of an annular ring 178 fitting in an annular slot 180 in the outer race housing 182 of a bearing 184 rotatably mounted upon the central part of the shaft 140. When the hydraulically actuated piston 97 (Fig. 4) is slid from its centralized position, the tilting box 98 is swung from its central or neutral full-line position shown in Fig. 4, and the shift lever 172 (Fig. 7) is moved one way or the other from its neutral position in which its central axis 186 is disposed at right angles to the axis of the shaft 140, causing said shaft to move lengthwise. Lengthwise movement of the shaft 140 will cause the helical thread 142 on the shaft to rotate the gear 146 and accordingly to advance the nut 164 one way or the other with relation to the shaft 140 in accordance with the direction of lengthwise movement of the shaft 140. The speed and direction of movement of the mount or of the guns on the mount depends upon the amount and the direction of tilting of the tilting box 98. Accordingly, the amount and the direction of displacement of the shift lever 172 from said neutral position and the amount and the direction of lead of the limit stop screw 153 or 154 and accordingly the nut 164 over the shaft 140 will vary in accordance with variations in the speed and the direction of movement of the mount or of the guns on the mount. The greater the tilting of the box 98 and accordingly the speed of the mount or of the guns on the mount, the greater will be the lengthwise displacement of the shaft from its neutral position and accordingly the greater will be the distance of the guns from their zones of interference for that particular mount when the hydraulic drive begins to stop, said hydraulic drive being used as a cushion to absorb the inertia of the moving parts to be stopped. The above-disclosed mechanism forms part of regular equipment long in use for controlling the mounts and will not be further described herein.

When the projections 168, 170 of the nut 164 hit the projections 160, 162, respectively, on the collars 156, 158, movement of the limit stop screws 153, 154 will cease, but the continued rotation of the mounts or of the guns on the mounts will cause the shaft 140 to rotate to such a position as to move the shaft lengthwise back to its neutral position under the rotative action of the helical threads with relation to the then fixed gear 146, causing, through the bifurcated shift lever 172, the associated tilting box 98 to move back to its central or neutral position and accordingly movement of the mounts or of the guns on the mounts to stop, the oil in the variable-speed drive acting as a cushioning brake.

In order to actuate the cam-operated switches 64, 66, the azimuth and elevation limit stop screws 153, 154 are operatively connected to azimuth and elevation cam actuating shafts 188 (Figs. 5, 6 and 9), 190 (Figs. 7 and 8), respectively, rotatably mounted in bearings 192, 194 in housings 196 (Fig. 5), 198 (Fig. 7) which are secured to the housing 148 for the azimuth and elevation limit stop screw mechanism.

Mechanism for moving the azimuth cam actuating shaft 188 in timed relation with the azimuth stop screw 153 comprises a dog 204 (Fig. 5) formed integral with a bevel gear 208 and fitting in one of a plurality of radial slots of a nut 206 secured to the azimuth limit screw 153, the gear being rotatably mounted upon a bearing 210 secured to a part of the housing 196. The bevel gear 208 meshes with a bevel gear 212 at the lower end of a vertical shaft 214 rotatably mounted in the housing 196 and having at its upper end a worm 216 meshing with a worm gear 218 fixed to the right end of the cam actuating shaft 188. The construction and arrangement of the above drive is such that the cam actuating shaft 188 is rotated degree by degree with the mount in azimuth.

The mechanism for operatively connecting the elevation cam actuating shaft 190 with the elevation limit stop screw 154 is similar to corresponding mechanism above described in connection with the azimuth drive and comprises a bevel gear 220 coupled by one or more keys 222 to the elevation limit stop screw 154, and a bevel gear 224 which meshes with the bevel gear 220 and is secured to a rotatable shaft 226 having secured to it a worm 228 meshing with a worm gear 230 secured to one end of the cam actuating shaft 190. The construction and arrangement of the above drive is such that the elevation cam actuating shaft 190 is rotated three degrees for every degree of rotation of the guns upon their trunnions in the mounts.

Secured to the left end (Fig. 5) of the azimuth cam actuating shaft 188 (Figs. 5, 6 and 9) for mount II is an enlarged cylinder 232 over which fits a sleeve 234. The sleeve 234 and the cylinder 232 are each provided with four axially spaced rows of circumferentially arranged holes 236, 238, respectively, the holes of one row being circumferentially offset from the holes of the other row. The holes 238 of the cylinder are threaded, the construction and arrangement being such that the sleeve 234 for purposes of timing the cam may be secured in degree increments to the cylinder by a screw 240. Fitting upon a step portion of the cam actuating shaft 188 and having its right end (Fig. 5) in engagement with a hub portion 243 (Fig. 9) of the bearing 192 is a cam sleeve 242 provided with two cams 244, 246. Extending from the sleeve 234 is a lug 248 (Fig. 9) constructed and arranged to fit in a channel 250 of the cam sleeve 242, the arrangement being such that the cams 244, 246 are rotatable together with the adjustment sleeve 234 and the cam actuating shaft 188 after said cams have been properly timed with the limit stop screw 153 by adjusting said sleeve upon and securing it to the cylinder 232 of said shaft.

Figure 9:
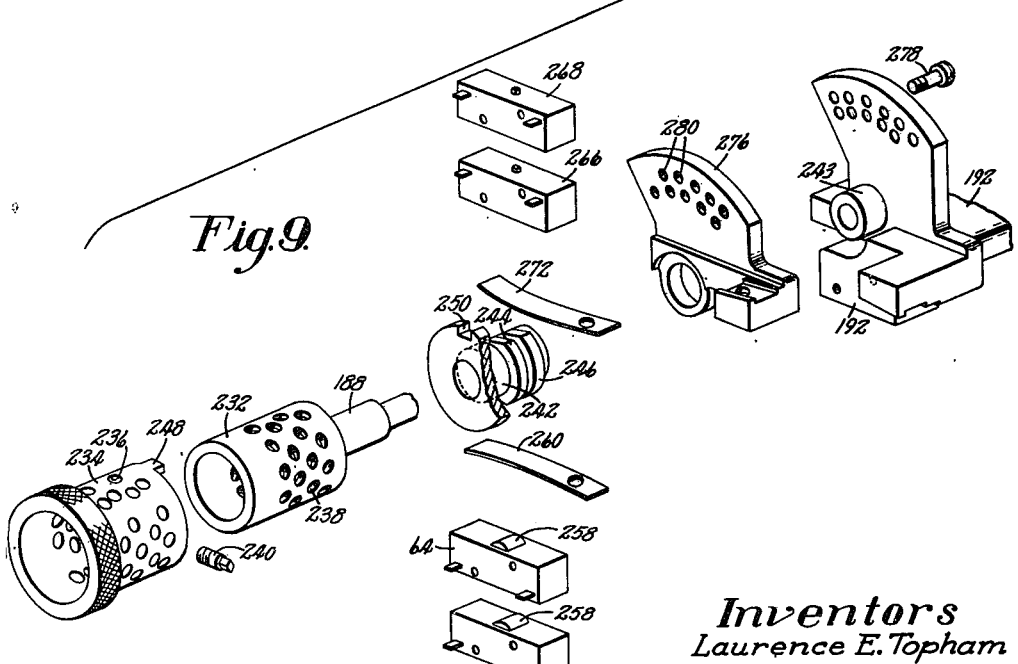
Fig. 9 is an exploded view showing switch supporting and operating mechanism illustrated in Fig. 5.
Figure 5:
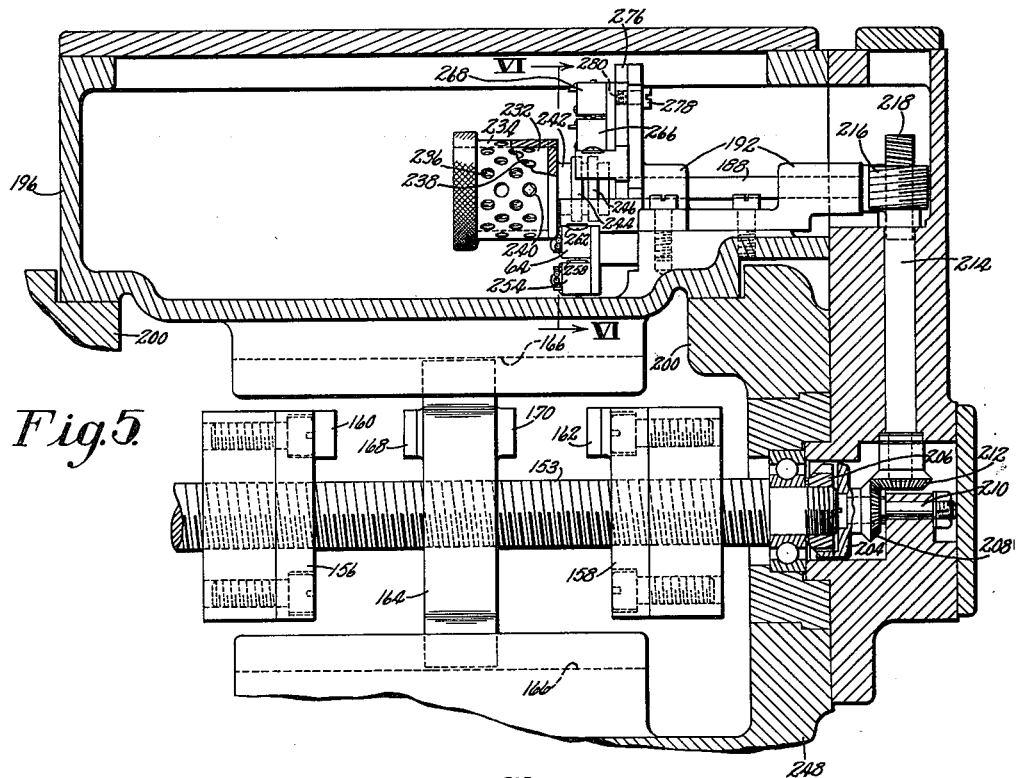
Fig. 5 is a vertical section showing portions of limit stop mechanism for the mount of turret azimuth drive, together with mechanism operatively connected to said drive for registering movement in azimuth of the mount and accordingly movement in azimuth of the guns of said mount.
Figure 6:
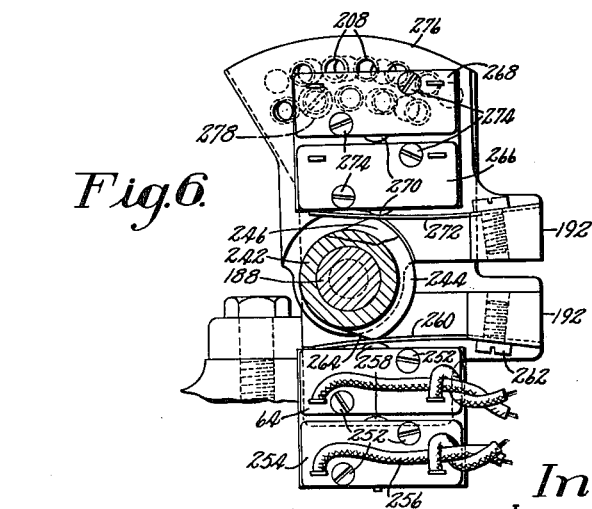
Fig. 6 is a section on line VI—VI of Fig. 5.

Secured by screws 252 (Fig. 6) to the bearing 192 is the azimuth switch 64 and a switch 254 (Figs. 5, 6, 9, 11 to 17) which is arranged in a red light circuit 256, hereinafter referred to, and which is closed together with the switch 64 upon upward movement of alined plungers 258 (Figs. 5, 6 and 9). Interposed between the cam 244 and the upper plunger 258 is a leaf spring 260 (Figs. 6 and 9) attached by a screw 262 to the bearing 192. The timing between the cam 244 and mount II is such that as the central axis 42 of that mount moves counterclockwise across the 266th meridian (Figs. 2 and 3) the leaf spring 260 has been permitted to move down a shoulder 264 (Fig. 6) of the cam 244 onto a low portion of the cam with the result that the plungers 258 are raised by the action of springs (not shown) to close the switches 64, 254.

It will be understood that the cam 244 is the only azimuth registering cam utilized in connection with mount II since the 266th meridian (Fig. 3), indicated by reference numeral 59 (Fig. 2), is the only meridian crossed by the central axis 42 in moving into zone A for mount II. It will be appreciated, however, that since in mount VI there are two zones A of similar construction, two switches are necessary to register movement of the central axis 42 in opposite directions across the 266th and the 274th meridians, respectively, defining the adjacent ends of said zones A. Accordingly, if we were considering mount VI specifically, an azimuth switch 266 (Figs. 5, 6 and 9) and a red light switch 268 corresponding to switch 254 would be wired, these switches being actuated by alined plungers 270 (Fig. 6) the lower of which operates against a leaf spring 272 to force said spring against the cam 246, the construction and arrangement being such that said switches are closed when the central axis 42 of mount VI moves clockwise across the 274th meridian. The switches 266, 268 are secured by screws 274 (Fig. 6) to a segment plate 276 (Figs. 6 and 9) which fits on the hub portion 243 of the bearing 192 and is secured to said bearing by a screw 278 extending through one bore of two series of arcuately arranged bores in said bearing, said plate being provided with a plurality of threaded recesses 280 for adjusting the plate 276 into any one of various arcuate positions one degree apart to obtain the proper timing of the switches 266, 268. It will be apparent that the switch operating mechanism illustrated in Figs. 5 and 6 may be used in mount VI by wiring the switches 266, 268. In view of the fact, however, that mounts II and IV only are being considered in detail, no further description of the construction for actuating mount VI will be necessary, it being understood that it may be convenient to use similar cam sleeves on mounts II and VI even though only one of the cams of said sleeves is used when operating in connection with mount II.

Secured to the left end (Fig. 7) of the elevation cam actuating shaft 190 is an enlarged cylinder 282 similar to the cylinder 232, and fitting slidingly over the cylinder is a coupling sleeve 284. Fitting upon the cam actuating shaft 190 with its right end engaging a shoulder of a boss of the bearing 194 is a cam carrying sleeve 286 (Figs. 7, 8 and 10) which is provided with a notch 287 (Fig. 10) for receiving a lug 288 (Fig. 7) similar to the lug 248 of the sleeve 234. As above stated, the cam actuating shaft 190 rotates three degrees for every degree of rotation of the guns 32 on their trunnions and accordingly holes 290 in the sleeve 284 and threaded holes 292 in the cylinder 282 are so constructed and arranged that the sleeve 284 may be secured to the cylinder by a screw 294 in three degree settings to afford the proper timing of elevation cams 296, 298 with relation to the shaft 190. The switch 66 is secured to the bearing 194 opposite to the cam 296 by screws 300 (Fig. 8), a springpressed plunger 302 of the switch forcing a leaf spring 304, secured by screws 306 (Figs. 7 and 8) to the bearing, against the cam. As the leaf spring 304 slides down a shoulder 308 (Fig. 8) of the cam 296 onto a lowered portion of the cam, the plunger 302 is raised, as viewed in Fig. 8, by its spring (not shown), causing closing of the switch 66. It will be appreciated that in considering mount II, the switch 66 is the only switch necessary to register movement of the guns in elevation into zone A, such switch registering movement of the guns in negative elevation across the 22d parallel.

It will be noted that in mount IV, two elevation switches 70, 72 (Figs. 11 to 17) are necessary since the guns move into each of zones B in negative and positive elevation across the 62d and the 13th parallels. In mounts such as mount IV where the guns can enter the zones of interference for that particular mount across two parallels, there is provided, for example, an additional switch 310 (Figs. 7 and 8) which is attached by screws 312 to a segment plate 314 secured in different angular positions to an extension of a bearing, corresponding to bearing 194, by a screw 316.

Figure 11:
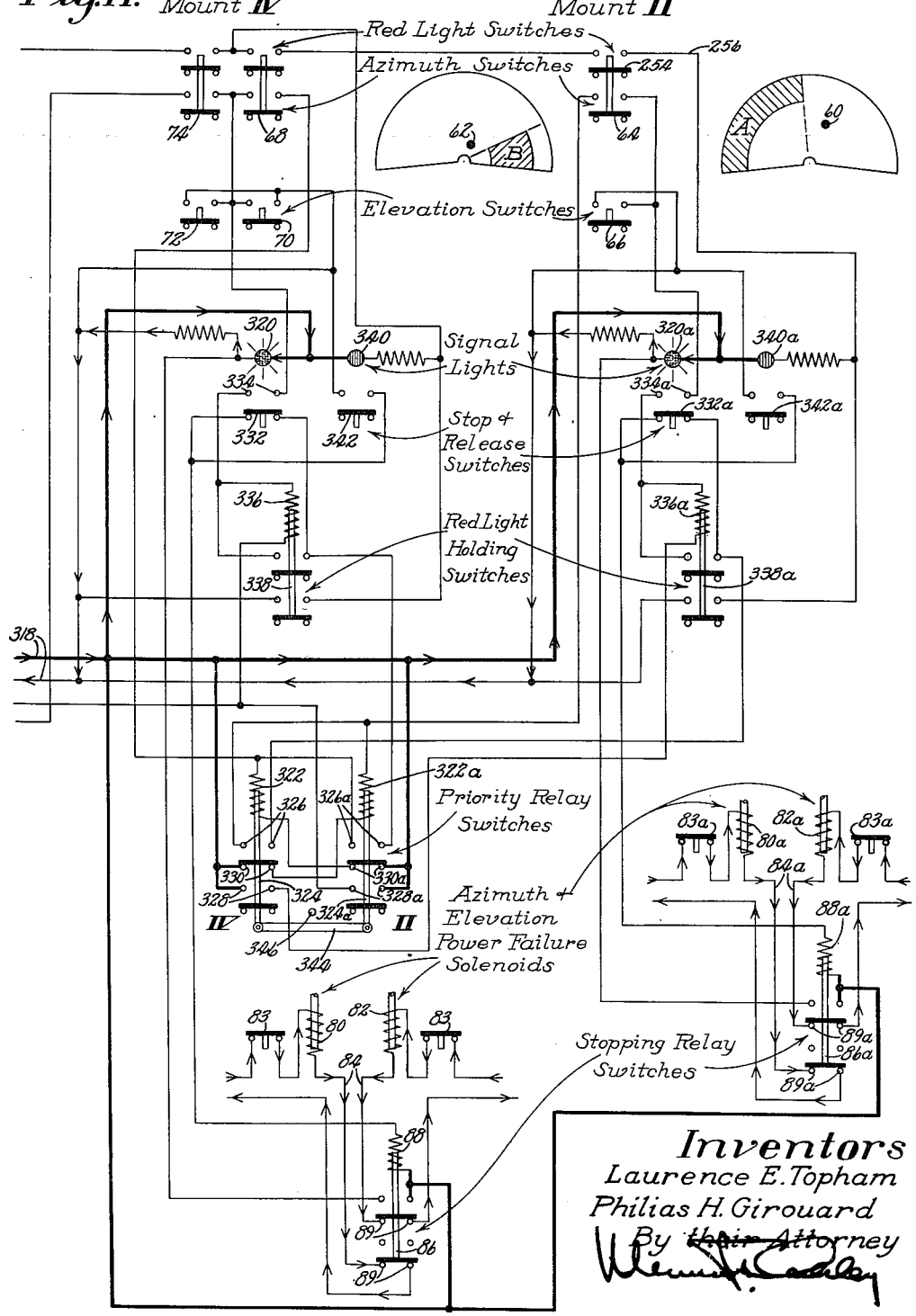

In briefly describing the operation of mounts II and IV of the interference control device, wiring diagrams (Figs. 11 to 17) showing the positions of the various electrically actuated parts and the flow of currents in the various circuits of said device are referred to. Fig. 11 shows the device when the guns 32 of mount II and IV, indicated by black dots 60, 62, respectively, are outside their interference zones A, B, a 110-volt circuit 318 maintaining power-indicating amber lights 320, 320a burning in the mounts and the 440-volt circuits 84, 84a energizing the power failure solenoids 80, 82 and 80a, 82a of mounts IV and II, respectively, the azimuth switches 64, 68 and the elevation switches 66, 70 and 72 of mounts II and IV, respectively, being open.

When one or more of the guns 32 of mount IV have entered the interference zone B for the mount along the dotted line connected to the dot 62, as illustrated in Fig. 12, the dot 60, representing the guns of mount II, still being outside the interference zone A for mount II, the azimuth and elevation switches 68, 70 will have been closed due to the guns moving in negative elevation across the 62d parallel (Fig. 3) and clockwise across the 339th meridian. The effect of closing the switches 68, 70 is to pass current through the coil 322 of an electromagnetic switch 324, commonly referred to as a priority relay switch, the switch then bridging contacts 326, 328, respectively. One result of the closing of the switch 324 is to open contacts 330 which are in series with a coil 322a of the mating electromagnetic switch 324a, thus rendering the electromagnetic operation of the switch 324a impossible so long as such condition exists. The second result of closing the pair of contacts 326 is to interconnect circuits to the cam-operated open switches 64, 66 of mount II with the coil 88 of the electromagnetic switch 86 for mount IV, normally closed contacts 89a of which switch are in circuits 84a of the power failure solenoids 80a, 82a of mount II.

Should the guns 32 of mount II, represented by dot 60, move in the indicated dotted path (Fig. 13), the cam-operated switch 64 is closed upon counterclockwise movement of the guns across the 266th meridian, and upon continued movement of the guns to the border of zone A, that is, to the 22d parallel, the cam-operated switch 66 is closed. Such action results in the coil 88a of the switch 86a of mount II being energized and accordingly such switch being raised from its position shown in Fig. 12 to its position shown in Fig. 13, away from the normally closed contacts 89a in the circuits of the power failure solenoids 80a, 82a, thus de-energizing said solenoids. Upon de-energizing the solenoids 80a, 82a, associated valves 90 (Fig. 4) in the systems for moving the guns of mount II in azimuth and elevation, respectively, are actuated by the action of corresponding springs 92, with the result that high pressure oil in the system 94 is dumped, associated tilting boxes 98 are moved to their neutral full-line positions shown in Fig. 4, and mount II and its guns come quickly to rest. The closing of the azimuth and elevation cam-actuated switches 64, 66 of mount II and the movement of the switch 86a for mount II to its position shown in Fig. 13 also causes the amber light 320a for mount II to be by-passed and accordingly extinguished, thereby informing the crewmen of that mount that there is no hydraulic driving power for that mount.

As above stated, the captain of mount II which is stopped at the 22d parallel may render the guns 32 of his mount operative to move away from the interference zone A, or to travel into said zone, by setting a selector valve 99 of that mount to "hand" position, giving him through means 101 local control of the mount, and pressing, against the action of a spring (not shown), a release or restart switch 332a to the position shown in Fig. 14, in which said switch bridges contacts 334a of mount II, thus opening the circuit in which the coil 88a is included, thereby allowing the switch 86a to move back across the pairs of contacts 89a so as to re-establish the currents in the power solenoid circuits 84a. The pressing of the restart switch 332a also establishes a current through a coil 336a of an electromagnetic holding switch 338a, thereby closing the switch and accordingly causing red lights 340, 340a to be lit in mounts IV and II, respectively. Should the captain of mount II decide to move clear of the interference zone A and to go back on the director, for example, the guns are swung a short distance outside of said zone, pressure then being removed from the release or restart switch 332a which snaps back under spring action to its retracted position. The guns 32 of mount II then being "in the clear" outside the zone A, the amber light 320a remains lit after the switch 332a has been retracted, thus indicating that the mount is again active, and the red lights are extinguished. The selector valve 99 is slidable in a recess of a housing secured to the mount and the switches 324, 324A are arranged in a box which is secured to the mount and is placed just above the selector valve.

Should the captain of mount II, instead of moving outside zone A, decide to move the guns 32 of his mount into the interference zone A while holding the restart switch 332a bridged across the contacts 334a, the amber and red lights 320, 320a, and 340 and 340a of the respective mounts will be lit so long as the guns of both mounts are moving in the common interference zone, the red lights indicating that the guns of both mounts are in said zone and the amber lights, as above explained, indicating that the mounts are powered.

Should the captain of mount II decide, because of an imminent possibility of collision, to stop his mount, he releases the switch 332a which moves by spring action back to its position shown in Fig. 15, with the result that the guns of mount II stop because the azimuth and elevation power failure solenoid circuits 84a are again opened, and the amber light 320a of mount II, but not the amber light 320 of mount IV, is extinguished, the red lights 340, 340a continuing to shine by reason of the fact that current is maintained in coil 336a of the electromagnetic holding switch 338a by a holding circuit 341a (Figs. 14 to 16). The permitting of the restart switch 332a to be retracted to stop mount II does not affect the operation of mount IV.

While the guns 32 of mount II are stopped in the interference zone A, the captain of mount IV may at any time stop his mount by pressing a stop switch 342, thus energizing the coil 88 of the electromagnetic switch 86 of mount IV to open the circuits 84, and accordingly de-energizing the power failure solenoids 80, 82. The pressing of the stop switch 342 also causes the amber light 320 of that mount to be by-passed, thereby extinguishing said light and thus indicating to the crewmen of mount IV that the mount is stopped in the interference zone. Mount IV may again be started by releasing the stop switch 342. It will be noted that the stopping of the guns 32 of mount IV in zone A in no way affects the already established priority of mount IV.

Should the current fail when the guns 32 of mounts II and IV are stopped in the interference zones A and B, there is likely to be considerable chattering of the priority electromagnetic switches 324, 324a of the two mounts before one switch becomes established over the other. In order to avoid this condition, the switches 324, 324a are operatively connected by an equalizing bar 344 (Fig. 11), which is constructed and arranged to strike a fixed stud 346 as it is raised by one of the switches.

Should the captain of mount IV, operating under conditions illustrated in Fig. 16, decide to move out of the zone of interference B in order to avoid collision, for example, he sets his selector valve (not shown) to "hand" operation, giving him local control of the mount, releases the stop switch 342, and moves the guns of the mount in negative elevation across the 13th parallel out of zone B to the position shown in Fig. 17. Releasing of the stop switch 342 causes discontinuance of the current in the circuit in which coil 88 is located and thus re-establishes current in the power failure solenoid circuits 84, thereby again powering the guns of mount IV. When the guns of mount IV move in negative elevation across the 13th parallel, the elevation switch 70 for that mount is opened, with the result that the coil 322 of the electromagnetic switch 324 is de-energized, thus permitting the switch 324 to be moved away from contacts 328, 330, and the coil 322a is energized, permitting the electromagnetic switch 324a to bridge contacts 326a, 328a, resulting in establishing priority for the guns of mount II. Movement of the electromagnetic switch 324 away from the contacts 328 also opens the red light circuit 256, thus causing the lights 340, 340a to be extinguished, the mount II being permitted to move about uninterruptedly in zone A. The various switches above described and illustrated on the wiring diagram of Figs. 11 to 17 are mounted in a suitable box secured to a wall of the turret.

Having described our invention, what we claim as new and desire to secure by Letters Patent of the United States is:

1. In a battery comprising two guns mounted for independent movement in azimuth and elevation and having a common zone of bodily interference, means for causing either of said guns to enter and to move uninterruptedly in said zone providing the other gun is not in said zone, and automatic means for stopping either of the guns near the border of said zone whenever the other gun is in said zone.

2. In a control device for preventing collisions between guns incorporated in adjacent turrets and having a common zone of bodily interference, hydraulic means for swinging said guns together with their associated turrets in azimuth and for swinging said guns in elevation with relation to their associated turrets, and automatic mechanism responsive to movement of the guns of the turrets for rendering said hydraulic means for the guns of one turret at the border of said zone inoperative when the guns of the other turret are in said zone, thereby causing the guns of said one turret to stop.

3. In combination with a pair of powered turrets the guns of which have a common zone of bodily interference, means for moving the guns together with their associated turrets in azimuth, means for moving the guns with relation to their associated turrets in elevation, automatic means responsive to movement of a gun of either of the turrets for maintaining the first and second named means active to enable said gun to enter said zone and to move uninterruptedly in said zone provided that a gun of the other turret is not in said zone, and automatic means for rendering said first and second named means inactive in stopping movement of a gun of either of the turrets about to enter said zone when a gun of the other turret is in said zone.

4. In combination with a pair of armed turrets the guns of which have a common zone of bodily interference, fluid pressure means for moving the guns together with their associated turrets in azimuth, fluid pressure means for moving the guns in elevation with relation to their associated turrets, automatic means responsive to movement of a gun of either of the turrets for maintaining said fluid pressure means active to enable such gun to move freely into said zone and to move freely in and emerge from said zone when a gun of the other turret is not in said zone, and automatic means for rendering said fluid pressure means ineffective to operate a gun of said other turret when a gun of said other turret attempts to enter the interference zone already occupied by a gun of the first turret.

5. In combination with a pair of armed turrets the guns of which have a common zone of bodily interference, means for moving the guns together with their associated turrets in azimuth, means for moving the guns with relation to their associated turrets in elevation, automatic means responsive to movement of a gun of either of the turrets for enabling such gun to enter and to move about uninterruptedly in said interference zone when a gun of the other turret is not in said zone, automatic means for stopping movement of a gun of either of the turrets about to enter said zone when a gun of the other turret is in said zone, and means for rendering said first and second named means active to enable the stopped gun to move in elevation and in azimuth into and in the interference zone even though a gun of the other turret is in said zone.

6. In combination with a pair of armed turrets the guns of which have a common zone of bodily interference, means for moving the guns together with their associated turrets in azimuth, means for moving the guns in elevation with relation to their associated turrets, automatic means responsive to movement of said guns for enabling a gun of either of the turrets to enter and to move about uninterruptedly in said interference zone when a gun of the other turret is not in said zone, automatic means responsive to movement of said guns for stopping movement of a gun of either of the turrets about to enter said zone when a gun of the other turret is in said zone, means for rendering said first and second named means active to enable the gun of the stopped turret to move in azimuth and elevation and to enter the interference zone even though a gun of the other turret is already in said zone, and a recognizable signal in each of the turrets for informing crewmen of both turrets when guns of both turrets are in said zone.

7. In a battery comprising two guns which are mounted for independent movement in azimuth and elevation and have a common zone of bodily interference, hydraulic means for operating said guns, cams movable in timed relation with associated guns for registering entry of said guns into said zone, electric means responsive to movement of said cams, and automatic means operative in response to said electric means for enabling one of the guns at a time under the action of said hydraulic means to enter and to move uninterruptedly about in said zone and for causing said hydraulic means of either of the guns to be rendered inoperative when it attempts to enter said zone and the other gun is already in said zone.

8. In combination with a pair of mounts the guns of which have a common zone of bodily interference, control means for the guns of said mounts, said control means comprising cams operated in timed relation with one or more guns of each of the mounts for registering movement of said one or more guns of the mounts into and out of said interference zone, and automatic means operative in response to movement of said cams for causing movement of one or more guns of either of the mounts to cease just prior to entry into said zone when one or more guns of the other mount are in said zone.

9. A control device for a pair of adjacent mounts guns of which have a common zone of bodily interference, said device comprising power mechanism for moving said guns, means for establishing priority for a mount a gun of which is first to enter said interference zone, thereby causing said gun to move about uninterruptedly in said zone, automatic means actuated in response to the presence of said gun of the first mount in said zone and in response to the presence of a gun of the other mount about to enter said zone for stopping said mechanism which drives the gun of said other mount, thereby causing said gun to stop at the border of said zone, and means controlled from inside said other mount for reinstating power to said mount to cause its gun stopped at the border of the interference zone to be moved into or away from said zone whether or not the gun of the mount having priority is in said zone.

10. In combination with a pair of adjacent mounts guns of which have a common zone of bodily interference, fluid-actuated means for moving the guns in azimuth together with their mounts and for moving the guns in elevation with relation to their mounts, fluid dumping valves for causing said means to be rendered inoperative, cams movable in response to movement of the guns of the respective mounts in azimuth and elevation and in timed relation with said guns for registering when one or more guns of one of the mounts enters and remains in said interference zone, and means comprising an electrically operated device which is movable in response to movement of the cams and is constructed and arranged to cause the fluid dumping valves associated with the mounts to be operated when a gun of the other of said mounts is about to enter said interference zone and a gun of said one of the mounts is in said zone, thereby causing movement of the guns of said other mount about to enter said zone to cease.

11. In combination with a pair of mounts adjacent guns respectively of which have a common zone of bodily interference, fluid pressure means for moving the guns together with their associated mounts in azimuth, fluid pressure means for moving the guns with relation to their associated mounts in elevation, means for enabling a gun of the first mount to enter said zone to be trained by said fluid pressure means without interruption in said zone, automatic mechanism for rendering said fluid pressure means inactive to cause a gun of the adjacent mount about to enter said zone to come to rest when said gun of the first mount is in said zone, restarting means for rendering said mechanism inactive in order to cause the gun of said adjacent mount about to enter said interference zone to be moved by said fluid pressure means into and in said zone even though the gun of the first mount is in said zone, and automatic means responsive to movement of a gun of said first mount out of said zone for rendering said mechanism inactive to enable the gun of said adjacent mount to move freely into said zone under the action of said fluid pressure means without having to operate said restarting means.

12. A control device for a pair of adjacent mounts guns of which have a common zone of bodily interference, said device comprising fluid drive mechanism for moving said guns, automatic means for causing a gun of a first mount about to enter said interference zone to establish priority in said zone with the result that said gun can move uninterruptedly into and about said zone, automatic means operative in responsive to the presence of said gun of the first mount in said zone and in response to the presence of a gun of the adjacent mount at the border of said zone for stopping portions of said mechanism to cut off power supplied to the gun of said adjacent mount, thereby causing such gun to stop, a visual signal appearing in each of the mounts for indicating that the guns of the respective mounts are powered, means for causing said signal in the adjacent mount to indicate when said gun of that mount has stopped, means controlled from inside the adjacent mount for reinstating power to the gun of that mount to cause said gun to be moved away from or into and in the interference zone, a danger signal in each of the mounts, and means for causing said danger signal to register in both mounts when the gun of said adjacent mount moves into and about said interference zone already occupied by the guns of the first mount.

13. A control device for a pair of adjacent mounts guns of which have a common zone of bodily interference, said device comprising fluid drive mechanism for moving said guns, automatic means for causing a gun of a first mount about to enter said interference zone to establish priority in said zone, thereby enabling the gun of said mount to enter and to travel uninterruptedly in said zone, automatic mechanism operative in response to the presence of said gun of the first mount in said zone and in response to the presence of a gun of the second mount at the border of said zone for stopping portions of said fluid drive mechanism to cut off power supplied to the gun of the second mount, thereby causing such gun to come to rest, restarting means for rendering said automatic mechanism inoperative to cause the gun of the second mount about to enter said interference zone to be power-moved into and about said zone even through the gun of the first mount is in said zone, a power-indicating signal of one color in each of the mounts, a danger-indicating signal of another color in each of the mounts, and means for causing the indicator and the danger signals of each mount to be lit when power has been re-established in the second mount by said restarting means and the gun of said second mount has been moved into said zone.

14. A control device for a pair of adjacent mounts guns of which have a common zone of bodily interference, said device comprising fluid drive mechanism for moving said guns, automatic means for causing a gun of a first mount about to enter said interference zone to establish priority in said zone with the result that said gun moves uninterruptedly in said zone, automatic means operative in response to the presence of the gun of the first mount in said zone and in response to the presence of a gun of the second mount at the border of said zone for stopping portions of said fluid drive mechanism to cut off power supplied to said second mount, thereby causing such gun to stop, a power-indicating signal of one color in each of the mounts, means for causing said signal to be lit when guns of the mount are powered, a danger signal of another color in each of the mounts, restarting means for rendering said second-named means inoperative to permit the gun of the second mount at the border of said interference zone to be power moved into and in said zone even though the gun of the first mount is in said zone, means for causing the power and danger signals of each of the mounts to be lit when power has been reinstated in the second mount by said restarting means and the gun of said second mount has been moved into said zone, and means for maintaining the danger signals in the mounts lit while the guns of said mounts are in said interference zone irrespective of whether the mounts are powered.

LAURENCE E. TOPHAM.
PHILIAS H. GIROUARD.

REFERENCES CITED

The following references are of record in the file of this patent:

UNITED STATES PATENTS

| Number | Name | Date |
|---|---|---|
| 933,218 | Wood | Sept. 7, 1909 |
| 1,023,943 | Knapp | Apr. 23, 1912 |
| 1,958,245 | Mittag et al. | May 8, 1934 |
| 2,189,823 | Vickers et al. | Feb. 13, 1940 |
| 2,271,445 | Tarris et al. | Jan. 27, 1942 |
| 2,404,127 | Ernst | July 16, 1946 |

FOREIGN PATENTS

| Number | Country | Date |
|---|---|---|
| 499,523 | Great Britain | Jan. 25, 1939 |

OTHER REFERENCES

Naval Bulletin No. 805, of Feb. 1942 (cited in applicants' spec.).